United States Patent
Croak et al.

(10) Patent No.: US 7,801,115 B1
(45) Date of Patent: Sep. 21, 2010

(54) METHOD AND APPARATUS FOR DATA MINING IN A COMMUNICATION NETWORK

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 371 days.

(21) Appl. No.: 11/263,297

(22) Filed: Oct. 31, 2005

(51) Int. Cl.
*H04L 12/66* (2006.01)

(52) U.S. Cl. ............ 370/352; 379/201.01; 379/201.02; 455/414.1; 455/432.3

(58) Field of Classification Search ................. 370/352; 379/201.01, 201.02; 455/414.1, 432.3
See application file for complete search history.

(56) References Cited

U.S. PATENT DOCUMENTS

| | | | |
|---|---|---|---|
| 7,103,388 B2 * | 9/2006 | Scott | ............................ 455/566 |
| 2005/0281276 A1 * | 12/2005 | West et al. | .................. 370/411 |
| 2006/0133405 A1 * | 6/2006 | Fee | ............................ 370/437 |
| 2007/0121509 A1 * | 5/2007 | Taylor et al. | ................. 370/235 |

OTHER PUBLICATIONS

U.S. Appl. No. 60/637,405 Fee System and Method for Providing Service-Agnostic Network Resources Dec. 17, 2004.*

* cited by examiner

*Primary Examiner*—Quynh H Nguyen

(57) ABSTRACT

Method and apparatus for data mining in a communication network is described. In one example, telephony service and data service is provided to an entity via a communication network. Customer specific information is collected for accesses to the entity via the communication network by customers. The customer specific information is analyzed to determine, for each of the customers, an access pattern related to accessing the telephony service and the data service. The access pattern of each customer may be used to help the entity determine if a segment of customers tend to access the telephony service or the data service, and if they do so simultaneously or across different points of time, as well as if they access one service more than another. The entity may use this information to determine if data services actually increase or decrease the need for call agents to handle calls via the telephony service.

17 Claims, 4 Drawing Sheets

METHOD AND APPARATUS FOR DATA MINING IN A COMMUNICATION NETWORK

BACKGROUND OF THE INVENTION

1. Field of the Invention

Embodiments of the present invention generally relate to telecommunications systems and, more particularly, to a method and apparatus for data mining in a communication network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VoIP) network.

Some network providers are configured to provide both telephony services and data services (e.g., Internet services). These services may be provided to various types of enterprise entities. The network provider has access to information for the customers of the enterprise entities that can be of great value to the enterprise entities. For example, an enterprise entity may find it useful to analyze customer access patterns with respect to telephony service versus data service. It is thus desirable for a network operator to mine this customer specific information. Accordingly, there exists a need in the art for a method and apparatus for data mining in a communication network.

SUMMARY OF THE INVENTION

Method and apparatus for data mining in a communication network is described. In one embodiment, telephony service and data service is provided to an entity via a communication network. Customer specific information is collected for accesses to the entity via the communication network by customers. The customer specific information is analyzed to determine, for each of the customers, an access pattern related to accessing the telephony service and the data service. The access pattern of each customer may be used to help the entity determine if a segment of customers tend to access the telephony service or the data service, and if they do so simultaneously or across different points of time, as well as if they access one service more than another. The entity may use this information to determine if data services actually increase or decrease the need for live call agents to handle calls via the telephony service.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
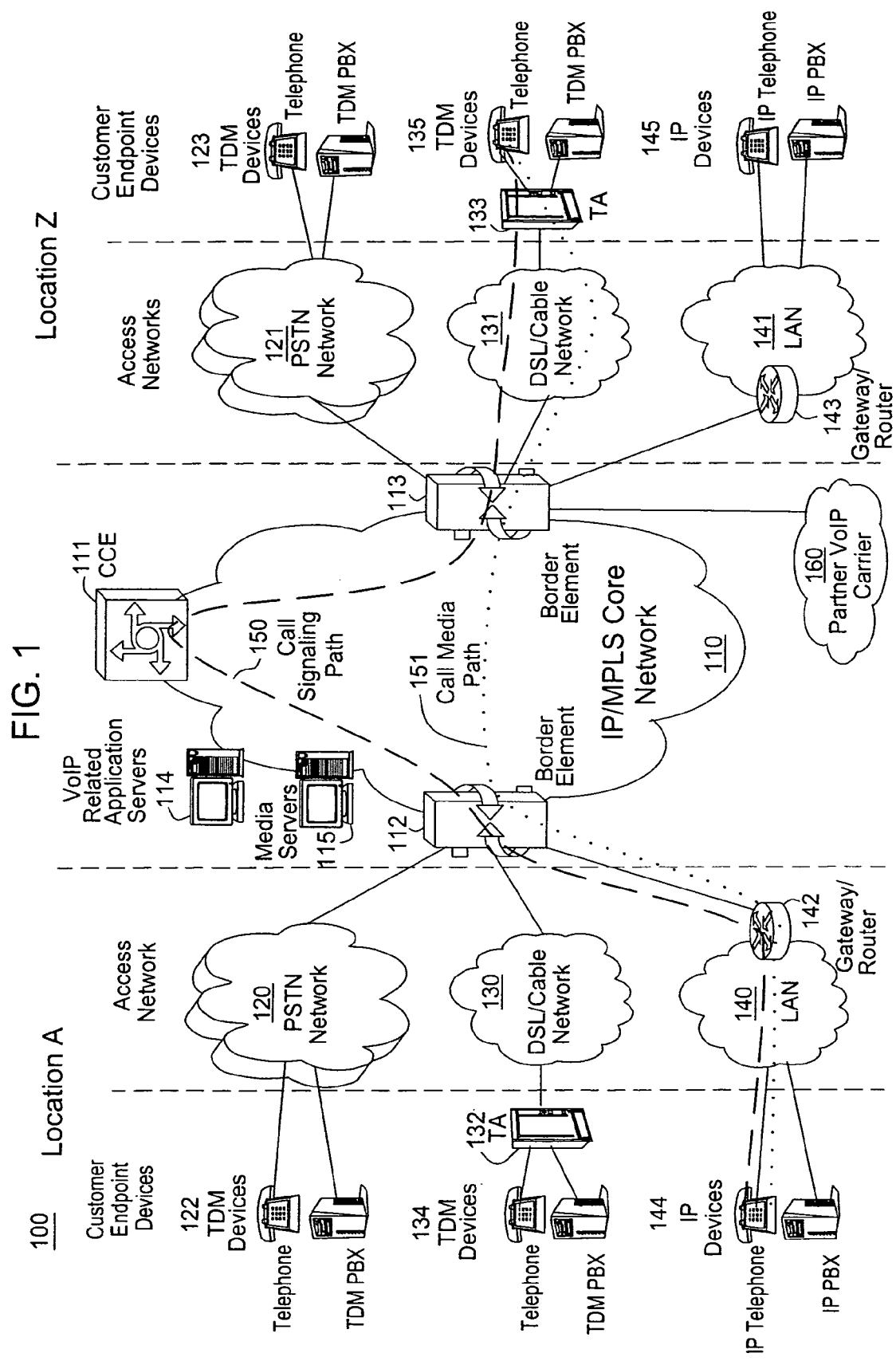
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
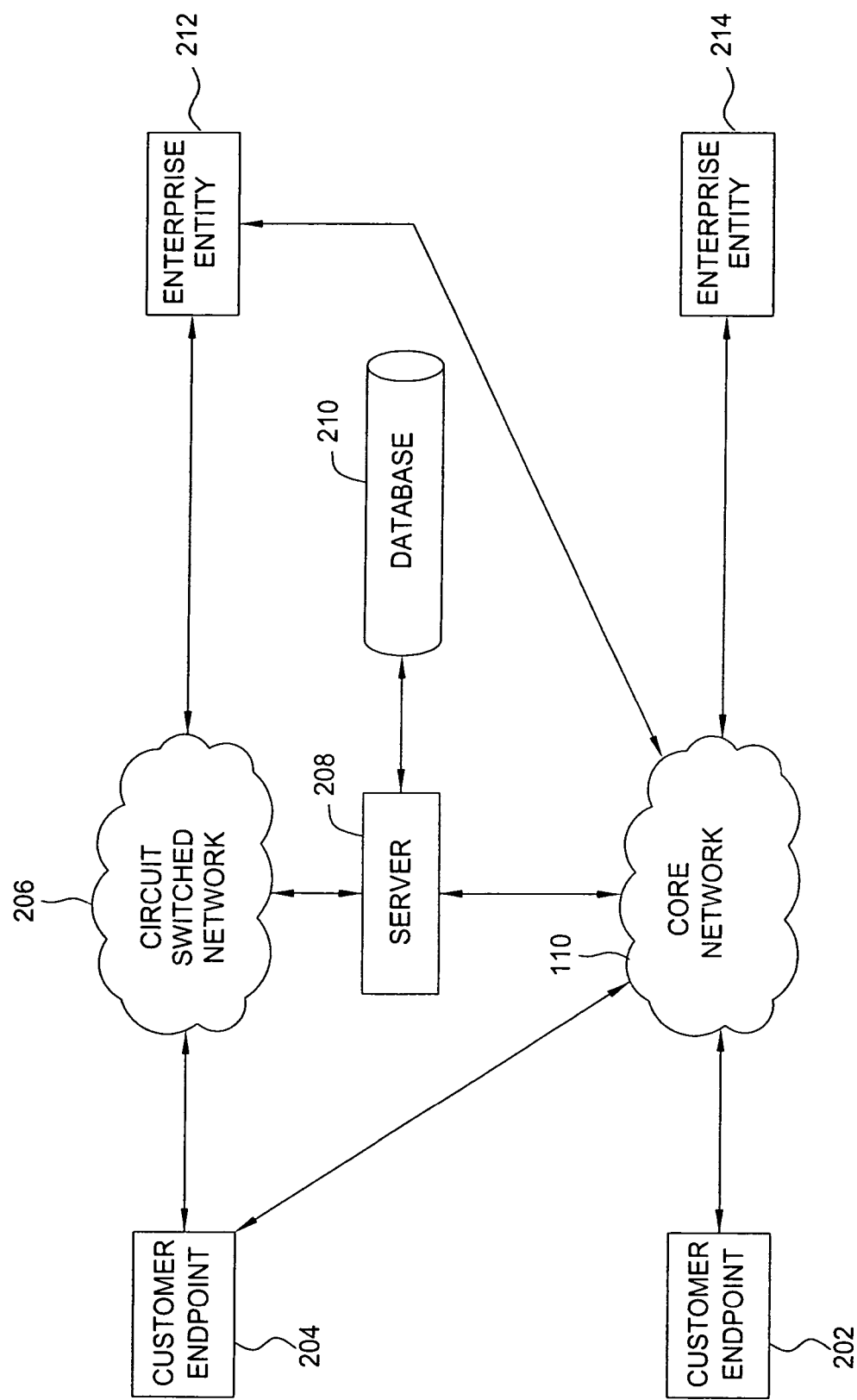
FIG. 2 is a block diagram depicting an exemplary configuration of the communication system constructed in accordance with one or more aspects of the invention.

FIG. 2 is a block diagram depicting an exemplary configuration of the communication system 100 constructed in accordance with one or more aspects of the invention. In the present embodiment, the communication system 100 includes a packet-switched portion (the core network 110) and a circuit-switched portion (circuit-switched network 206). The communication system 100 is configured to provide service to various user endpoints. For purposes of clarity by example, customer endpoints 202 and 204 and enterprise entities 212 and 214 are shown as user endpoints. It is to be understood that the communication system 100 may provide service to any number and type of user endpoints. The communication system 100 is configured to provide telephony service and data service to each of the enterprise entities 212. In one embodiment, data service comprises Internet service. The data service may be provide by either the circuit switched network 206 or the core network 110. The telephony service may comprise time division multiplexing (TDM) service provided via the circuit switched network 206. Alternatively, the telephony service may comprise VoIP or SoIP service provided via the core network 110.

The customer endpoints 202 and 204 may communicate with the enterprise entities 212 and 214 using the provided telephony service and/or the provided data service. For example, each of the enterprise entities 212 and 214 may provide a web site that can be accessed via the data service. Each of the enterprise entities 212 and 214 may use its web site to sell merchandise or services to consumers, for example. The web sites may be hosted by the enterprise entities 212 and 214, by the communication network 100, or by some other entity. In addition, the telephony service provided to each of the enterprise entities 212 and 214 may be toll-free service (e.g., 800 service). Each of the enterprise entities 212 and 214 may sell merchandise or services to consumers via its toll-free telephony service. The customer endpoints may be coupled to the core network 110, the circuit switched network 206, or both. In the present example, the customer endpoint 204 is coupled to both the circuit switched network 206 and the core network 110. The customer endpoint 202 is coupled to just the core network 110.

In accordance with one aspect of the invention, each of the circuit switched network 206 and the core network 110 is coupled to a server 208. The server 208 is in turn coupled to a database 210. The server 208 is configured to mine data associated with subscribers to data and telephony services of the communication system 100. In particular, the server 208 is configured to collect customer specific information for accesses to the enterprise entities 212 and 214 by the customers. The customer specific information may be stored in the database 210. That is, for each of the enterprise entities 212 and 214, the server 208 collects customer specific information for each access thereto, where each access may be via the telephony service or the data service. The customer specific information may include, for each access, a calling party identifier if the access is via the telephony service, and address identification data (e.g., customer name and address) if the access is via the data service. For each call to a telephony service, the server 208 may collect the customer specific information from an identifier field in the call (e.g., calling party identifier used for caller ID). For each access to the data service, the server 208 may collect the customer specific information based on previously collected registration data (e.g., the customer registers for data service access with the network).

The server 208 is also configured to analyze the collected customer specific information for each of the enterprise entities 212 and 214 to determine, for each of the customers, an access pattern related to accessing the telephony service and the data service. The access pattern for each of the customers may include a number of times the telephony service was accessed versus a number of times the data service was accessed over a time period. Alternatively or additionally, the access pattern may include for each of the customers temporal relationships between accesses to the telephony service and accesses to the data service. Those skilled in the art will appreciate that the access pattern for each customer may include other types of information related to accesses to the telephony and data services of an entity. For purposes of clarity by example, one a single server and a single database is shown. Those skilled in the art will appreciate that the communication system 100 may include multiple servers and databases.

In this manner, an embodiment of the invention provides a tool to mine data associated with subscribers to data and telephony services from a single network provider. In one embodiment, information regarding visits to specific enterprise web sites and calls to their toll-free numbers from individual customers is mined over time. The collected information may be analyzed to understand the correlation between customer behaviors. For example, the data mining may determine if a segment of customers tend to access both toll-free services and web-based catalogs, and if they do so simultaneously or across different points in time. In addition, the data mining may determine if certain customers tend to use one access method versus another, and how the tendency to use one or another can vary over time and frequency of use. This information can assist retailers in determining if web services actually increase or decrease the need for live call agents to handle toll-free calls and how this need may shift across time and frequency of use.

Figure 3:
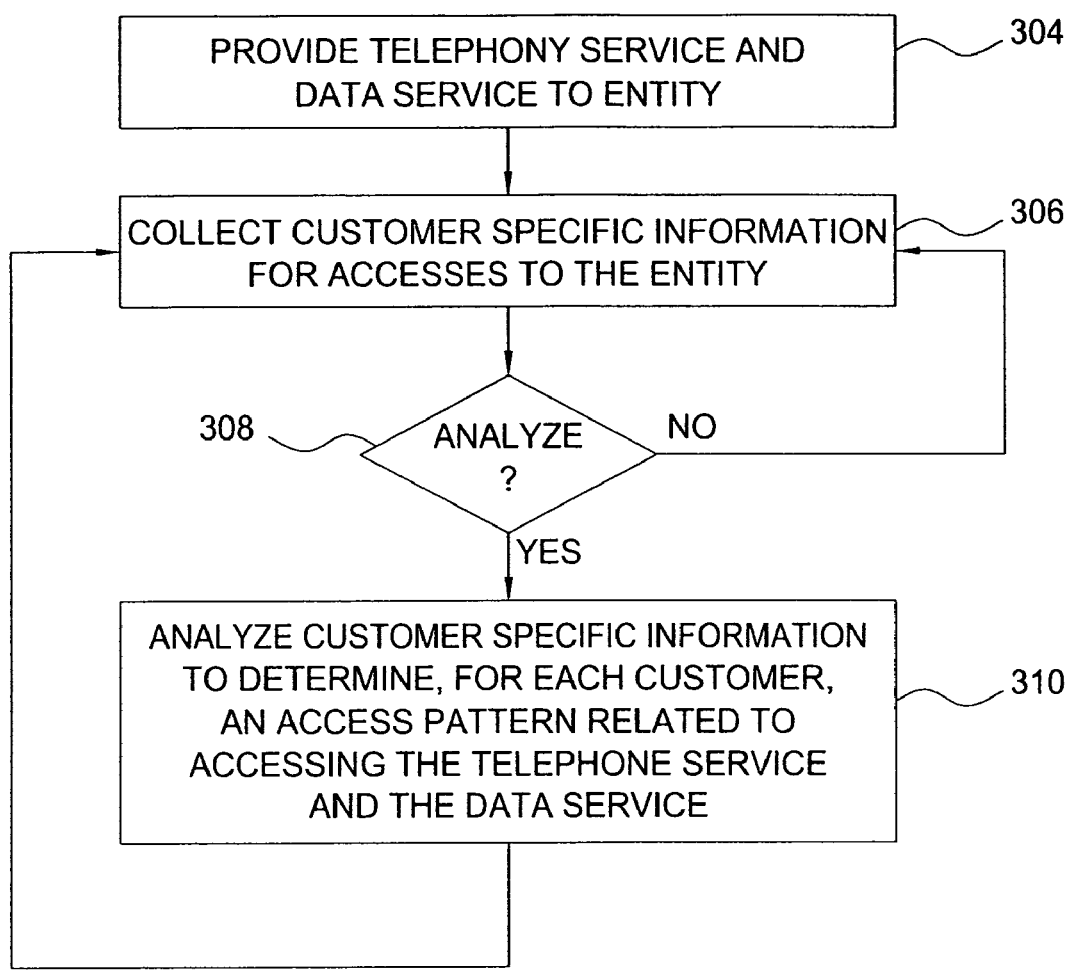
FIG. 3 is a flow diagram depicting an exemplary embodiment of a method for data mining in a communication network in accordance with one or more aspects of the invention.

FIG. 3 is a flow diagram depicting an exemplary embodiment of a method 300 for data mining in a communication network in accordance with one or more aspects of the invention. The method 300 begins at step 304, where telephony service and data service is provided to an entity via the communication network. That is, telephony service and data service is provisioned to the entity in a well known manner. At step 306, customer specific information is collected for accesses to the entity via the communication network by customers. At step 308, a determination is made whether the currently collected customer specific information should be analyzed. If not, the method 300 returns to step 306 and repeats. That is, the customer specific information may be collected on a continuous basis. If, at step 308, a determination is made to analyze the collected customer specific information, the method 300 proceeds to step 310. At step 310, the customer specific information is analyzed to determine, for each of the customers, an access pattern related to accessing the telephony service and the data service. The method 300 may then return to step 306 and repeat. Note that customer specific information may continue to be collected while the analysis at step 310 is performed. The method 300 may be performed for one or more enterprise entities coupled to the communication network.

Figure 4:
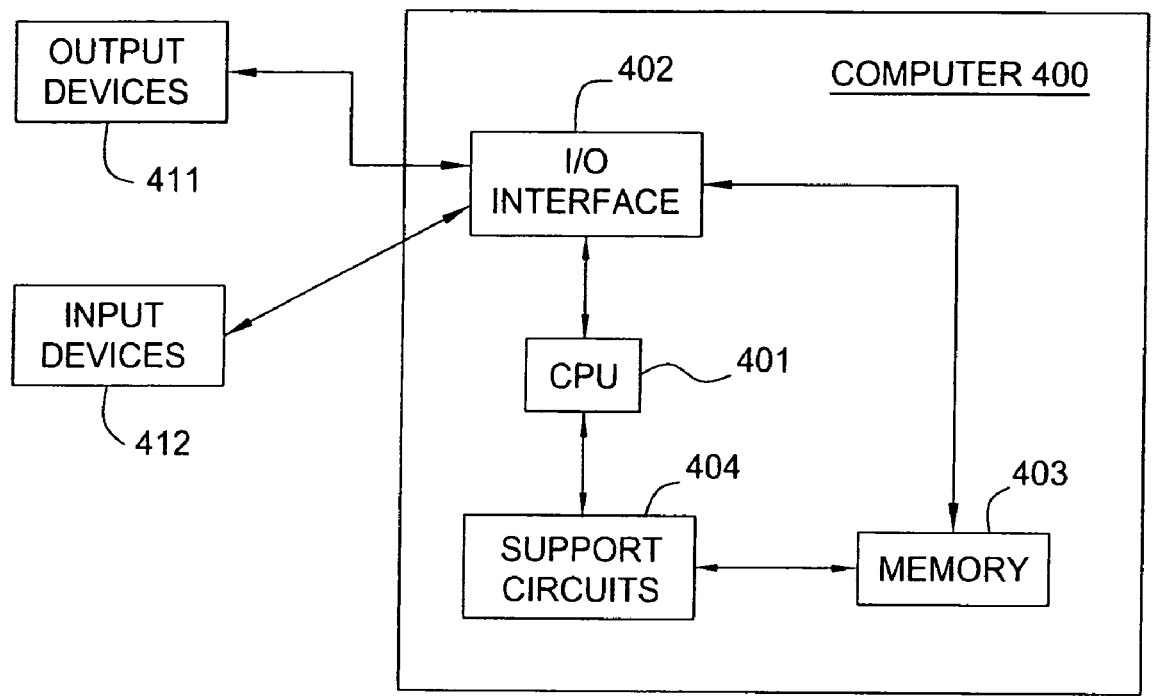
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. Notably, the computer 400 may be used to implement the server 208 of FIG. 2 and the method 300 of FIG. 3. The computer 400 includes a central processing unit (CPU) 401, a memory 403, various support circuits 404, and an I/O interface 402. The CPU 401 may be any type of microprocessor known in the art. The support circuits 404 for the CPU 401 include conventional cache, power supplies, clock circuits, data registers, I/O interfaces, and the like. The I/O interface 402 may be directly coupled to the memory 403 or coupled through the CPU 401. The I/O interface 402 may be coupled to various input devices 412 and output devices 411, such as a conventional keyboard, mouse, printer, and the like.

The memory 403 may store all or portions of one or more programs and/or data to implement the processes and methods described herein. Notably, the memory 403 may store program code to be executed by the CPU 401 for performing the method 300 of FIG. 3. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of data mining in a communication network, comprising:
   providing a telephony service and a data service to an entity via a communication network;
   collecting customer specific information for accesses to the entity via the communication network by customers;
   analyzing, via a processor, the customer specific information to determine, for each of the customers, an access pattern related to accessing the telephony service and the data service;
   wherein the access pattern for each of the customers includes temporal relationships between accesses to the telephony service and accesses to the data service; and
   adjusting said telephony service or said data service based upon said analyzing of the customer specific information, wherein said adjusting comprises increasing or decreasing said telephony service or said data service.

2. The method of claim 1, wherein the customer specific information comprises, for each access of the accesses, a calling party identifier of a respective one of the customers if the access is via the telephony service, and address identification data of a respective one of the customers if the access is via the data service.

3. The method of claim 1, wherein the access pattern for each of the customers includes a number of times the telephony service is accessed and a number of times the data service is accessed over a time period.

4. The method of claim 1, wherein the data service comprises an Internet service.

5. The method of claim 4, wherein the telephony service comprises a time division multiplexed (TDM) service over a circuit-switched portion of the communication network.

6. The method of claim 4, wherein the telephony service comprises a voice-over-internet protocol (VoIP) or a service-over-internet protocol (SoIP) over a packet-switched portion of the communication network.

7. Apparatus for data mining in a communication network, comprising:
   means for providing a telephony service and a data service to an entity via a communication network;
   means for collecting customer specific information for accesses to the entity via the communication network by customers;
   means for analyzing the customer specific information to determine, for each of the customers, an access pattern related to accessing the telephony service and the data service;
   wherein the access pattern for each of the customers includes temporal relationships between accesses to the telephony service and accesses to the data service; and
   means for adjusting said telephony service or said data service based upon said analyzing of the customer specific information, wherein said means for adjusting comprises increasing or decreasing said telephony service or said data service.

8. The apparatus of claim 7, wherein the customer specific information comprises, for each access of the accesses, a calling party identifier of a respective one of the customers if the access is via the telephony service, and address identification data of a respective one of the customers if the access is via the data service.

9. The apparatus of claim 7, wherein the access pattern for each of the customers includes a number of times the telephony service is accessed and a number of times the data service is accessed over a time period.

10. The apparatus of claim 7, wherein the data service comprises an Internet service.

11. The apparatus of claim 10, wherein the telephony service comprises a time division multiplexed (TDM) service over a circuit-switched portion of the communication network.

12. The apparatus of claim 10, wherein the telephony service comprises a voice-over-internet protocol (VoIP) or a service-over-internet protocol (SoIP) over a packet-switched portion of the communication network.

13. A non-transitory computer readable medium having stored thereon instructions that, when executed by a processor, cause the processor to perform a method of data mining in a communication network, comprising:
   providing a telephony service and a data service to an entity via a communication network;
   collecting customer specific information for accesses to the entity via the communication network by customers;
   analyzing the customer specific information to determine, for each of the customers, an access pattern related to accessing the telephony service and the data service;
   wherein the access pattern for each of the customers includes temporal relationships between accesses to the telephony service and accesses to the data service; and
   adjusting said telephony service or said data service based upon said analyzing of the customer specific information, wherein said adjusting comprises increasing or decreasing said telephony service or said data service.

14. The computer readable medium of claim 13, wherein the customer specific information comprises, for each access of the accesses, a calling party identifier of a respective one of the customers if the access is via the telephony service, and address identification data of a respective one of the customers if the access is via the data service.

15. The computer readable medium of claim 13, wherein the access pattern for each of the customers includes a number of times the telephony service is accessed and a number of times the data service is accessed over a time period.

16. The computer readable medium of claim 13, wherein the data service comprises an Internet service, and wherein the telephony service comprises a time division multiplexed (TDM) service over a circuit-switched portion of the communication network.

17. The computer readable medium of claim 13, wherein the data service comprises an Internet service, and wherein the telephony service comprises a voice-over-internet protocol (VoIP) or a service-over-internet protocol (SoIP) over a packet-switched portion of the communication network.

* * * * *